April 21, 1942.   B. W. MANTLE   2,280,296
LUBRICATING SYSTEM FOR COMPRESSORS OR THE LIKE
Filed June 14, 1940   2 Sheets-Sheet 1
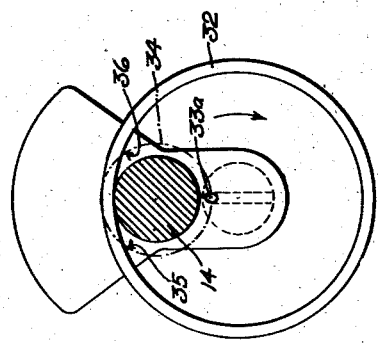
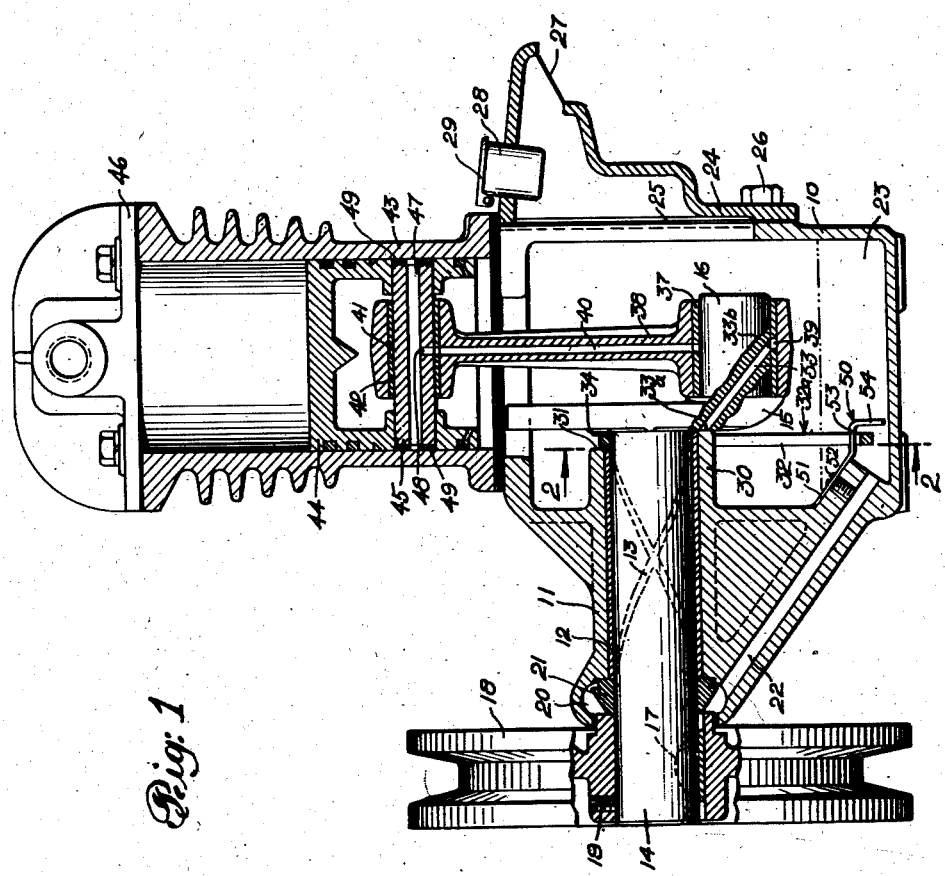
INVENTOR
*Burr Ward Mantle*
BY *Van Deventer & Grier*
ATTORNEYS.

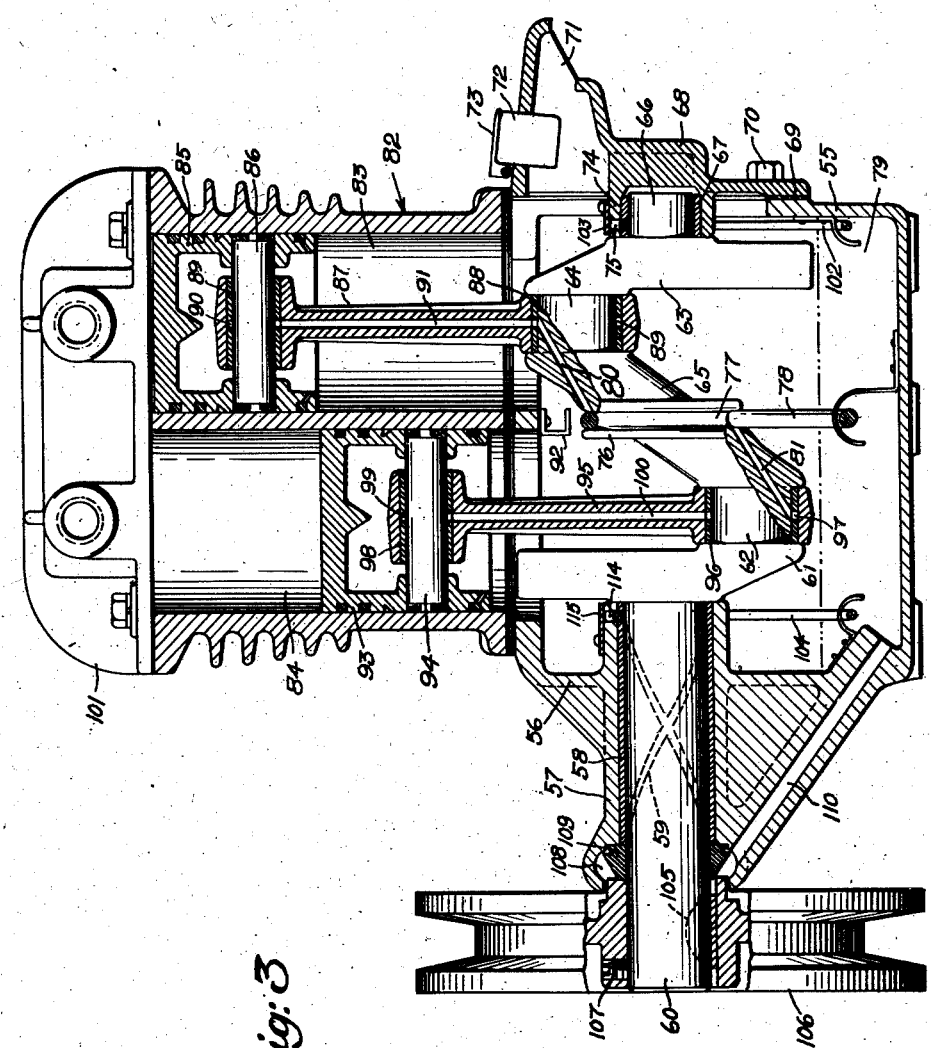

Patented Apr. 21, 1942

2,280,296

UNITED STATES PATENT OFFICE 2,280,296

LUBRICATING SYSTEM FOR COMPRESSORS OR THE LIKE

Burr Ward Mantle, Pittsford, N. Y., assignor to The American Brake Shoe and Foundry Company, a corporation of Delaware Application June 14, 1940, Serial No. 340,463

8 Claims. (Cl. 184—6)

This invention relates to improvements in lubricating systems for compressors or the like, and has for an object the provision in a compressor or the like a lubricating system in which a mechanical carrier moved by the crank shaft lifts lubricant from a body of lubricant in the bottom of the crank case and conveys the lubricant to the crank shaft. Some of the lubricant is utilized for lubricating the crank shaft and some of the lubricant is delivered, through suitable ducts, partly to the crank bearing and partly to the wrist pin bearing.

A further object of the invention is the provision, in a crank shaft, of a duct one end of which terminates in the crank pin, and the other end of which terminates at a point closely adjacent to the shaft, and so located that it contacts the lateral face of an oil ring, delivering oil to the shaft, once during each revolution of the crank shaft, whereby a limited quantity of said oil is delivered by said duct to the crank pin.

Another object of the invention is the provision, in a compressor or the like, of means for delivering oil to the wrist pin of the compressor, and the provision of a connecting rod having a duct formed therein, one end of which terminates in the crank bearing and the other end of which terminates in the wrist pin bearing, whereby oil from the crank pin is delivered by centrifugal force to the wrist pin bearing.

Yet another object of the invention is the provision in the arrangement described, of a wrist pin having a cross hole therein communicating with the hollow interior thereof whereby some of the oil arriving at the wrist pin bearing under centrifugal force may pass through said cross hole and be delivered to the cylinder walls via the hollow interior of the wrist pin.

Other objects will be apparent to those skilled in the art.

Referring to the drawings:

Figure 1 is a cross section elevation of a single cylinder compressor illustrating, by way of example, one form of the invention;

Figure 2 is a cross section, taken along the line 2—2 of Figure 1, showing the relation of the moving oil duct opening with respect to the moving oil ring; and Figure 3 is a sectional elevation of a two-cylinder compressor embodying a modified arrangement of that arrangement shown in Figure 1.

In the prior art, a ring oiler has been used to deliver oil from a supply in the base of the crank case to the crank shaft, instead of using the "splash" system, but the difficulty has been to prevent the moving parts of the compressor from getting too much oil, with the result that oil becomes mixed with the discharged compressed air or other medium.

In high speed compressors the excess oil actually becomes atomized into tiny globules of oil so finely divided that it is commonly termed "smoke." It is difficult to bring these minute particles of oil together in order to get them to coalesce, due to the fact that they are of the same electrical sign and repel each other.

The present invention was devised for delivering ample lubrication to all of the working parts of the compressor without providing an excess which would become mixed with the product (compressed air or other fluid medium) of the compressor.

Referring now to Figure 1, the compressor is provided with a crank case 10 which may have the end 11 formed integral therewith. The end 11 includes a bearing boss which is bored out and fitted with a suitable bearing 12 having the usual oil grooves 13 formed therein. A crank shaft 14 mounted in bearing 12 has a crank 15 formed integral therewith and carrying a crank pin 16 within the crank case 10.

The outer end of the crank case may be provided with a key 17 and may carry a fly wheel or pulley 18 which is secured to the crank shaft 14 by means of a set screw 19. An annular chamber 20 is formed in the outer end of the bearing boss 11, and an oil slinging collar 21 is mounted on the shaft 14 within the chamber 20. An oil duct 22 leads from the bottom of the chamber 20 to the bottom of the interior crank case 10 for returning oil from the bearing 12 and from the slinger 21 to the main body of oil 23.

The crank case 10 has a removable end plate 24 which is secured to the crank case with a gasket 25 therebetween by means of bolts, one of which may be seen at 26. The end plate 24 may have a breather opening 27 formed therein, and may carry a filler tube 28 provided with a suitable cover or closure 29. The inner portion 30 of the bearing boss is cut away at 31 to form a clearance for the oil ring 32, so that as the crank shaft 14 rotates, the oil ring 32 may freely rotate due to the frictional engagement of its inner surface with the outer surface of the shaft 14. Due to the difference between the diameter of the shaft 14 and that of the ring 32, the ring rotates slowly and brings up oil from the body 23 to the shaft 14, thereby lubrication is supplied to the bearing 12.

An angular duct 33, formed partially in the crank pin 16 and partially in the body of the crank 15, has one end terminating in the flat surface 34 of the crank, and has its other end terminating at a midpoint in the surface of the crank pin 16. The opening in the surface 34, forming one terminus of the duct 33, is termed the "opening 33ª," and the opening forming the other end of the duct 33 in the surface of the crank pin 16 is termed the "opening 33ᵇ."

Referring for the moment to Figure 2, it will be seen that the opening 33ª travels along a circular path designated by the numeral 34. This path, assuming that the crank is turning in a clockwise direction as viewed in Figure 2 and indicated by the arrow, is traversed by the opening 33ª which comes in contact with oil on the lateral surface 32ª of the ring 32 at a point indicated by the numeral 35, and this contact is interrupted at the point indicated by the numeral 36. Now, during the time that the opening 33ª is in contact with the oil on the said lateral surface of the ring 32, the relative motion of the lateral surface 32ª and of the hole 33ª is variable, due to the change in radial relation; and further, since the relative speeds of the opening 33ª and the ring 32, the ring may be said to intromit oil into the duct 33 via the hole or opening 33ª. This occurs only during a definite period of each revolution of the crank, the period being determined by the length of the arc of the ring between points 35 and 36 and the speed at which the crank shaft is being rotated.

The crank shaft is being rotated at a comparatively high speed, therefore, centrifugal force causes the oil entering the duct 33 to move therethrough and out via the end 33ᵇ into the connecting rod bearing 37 which is carried in the connecting rod 38. The connecting rod bearing 37 has a groove 39 formed therein which communicates with a passage 40 running longitudinally in the connecting rod to an oil groove 41 formed in the wrist pin bearing 42.

A cylinder 43 is secured to the crank case in any suitable manner and a piston 44 has a wrist pin 45 extending through the wrist pin bearing 42, so that as the crank shaft rotates, the piston 44 reciprocates in said cylinder. The cylinder 44 may be provided with the suitable cylinder head 46. The wrist pin 45 may have a central hole 47 formed therein and a cross hole 48 communicating therewith, said cross hole communicating with the oil groove 41 in the wrist pin bearing. Due to the action of centrifugal force, oil entering the groove 39 in the connecting rod bearing 37 passes up the duct or passage 40 to the wrist pin bearing, thereby lubricating the wrist pin, and some of the oil passes via the cross hole 48 to the interior hole 47 in the wrist pin 45 and flows to each end thereof to furnish lubrication to the walls of the cylinder 43. In some instances suitable felt washers 49 may be placed at each end of the wrist pin 45 to more evenly distribute the oil being fed to the cylinder walls.

Within the crank case is a stamping 50 which has an angular portion 51 secured to the crank case by means of a screw 52, a straight portion overlying the bottom of the ring 32 and a downwardly extending portion 54 extending to a point adjacent to the bottom of the crank case and thereby retaining the ring within a definite area in the bottom of the crank case.

The modification shown in Figure 3 relates to a two cylinder compressor in which a crank case 55 may have the end plate 56 formed integral therewith and including a bearing boss 57 which is bored out and fitted with a suitable bearing bushing 58 having oil grooves 59 formed therein. A crank shaft 60 mounted in the bearing 58 has a crank 61 formed integral therewith and carrying a crank pin 62.

A second crank 63 has a crank pin 64 which is displaced 180° from the crank pin 62. A web 65 joins the crank pins 62 and 64. The crank 63 carries a stud shaft 66 which is journaled in a bushing 67 in the end plate 68. The end plate 68 is secured to the open end of the crank case with a gasket 69 therebetween by cap screws, one of which is shown at 70.

The end plate 68 has a breather 71 formed therein and carries a filler tube 72 provided with a suitable cover or closure 73. The bearing boss 74 in the end plate 68, which carries the bearing 67, is provided with a clearance slot 75 which will presently be described.

Midway of the web 65 and concentric with the shafts 60 and 66 is an annular boss 76 having a groove 77 formed therein. A ring oiler 78 is positioned in the groove 77, and its lower portion hangs down to a point within the body of oil 79 in the crank case 55. As the crank shaft rotates, the oil ring 78 is moved by the groove 77, and oil adhering thereto is delivered to the groove 77 at the top thereof.

An angular duct 80 has one end terminating in the groove 77 and the other end terminating in the surface of the crank pin 64.

A second angular duct 81 has one end terminating in the groove 77 and the other end terminating in the surface of the crank pin 62. As the crank rotates, the oil adhering to the ring 78 is scooped up or scraped off the ring 78 by the open ends of the ducts 80 and 81 in the groove 77. This is due to the fact that these open ends have a motion with respect to the movement of the ring 78 which is variable due to the change in radial relation which begins when said openings are passing into the zone of said ring 78, and which terminates as they are passing out of the zone of the ring 78. In other words, the ring may be said to intromit oil into the ducts 80 and 81. This oil by centrifugal force passes through the ducts 80 and 81 to the crank pins 64 and 62, respectively.

A cylinder block 82 may have cylinders 83 and 84 formed therein and is secured to the top of the crank case 55 in any suitable manner. A piston 85 is mounted to reciprocate in the cylinder 83 and carries a wrist pin 86. A connecting rod 87 has at one end thereof a crank pin bearing 88 which has a groove 89 formed therein communicating with the duct 80. The connecting rod also carries on its other end a wrist pin bearing 89 having an oil groove 90 formed therein, for lubricating the wrist pin 86.

A duct 91 extends longitudinally in the connecting rod 87 and has one end communicating with the oil groove 89, and the other end communicating with the oil groove 90, so that as the crank shaft rotates, oil which is intromitted to the duct 80 by the ring 78, passes through the duct 80 due to centrifugal force. A part of this oil lubricates the crank pin 64 and part of it passes up the duct 91 to be delivered to the oil groove 90 in the wrist pin bearing thereby lubricating the wrist pin. The wrist pin 86 may be formed like the wrist pin 45 in Figure 1, so that some of the oil delivered to the oil groove 90 may pass to the interior of the wrist pin and lubricate the walls of the cylinder 83, in the manner described in connection with Figure 1.

A bracket 92, secured to the cylinder block 82 at a midpoint within the crank case, serves as a means to retain the oil ring 78 in the groove 77.

The cylinder 84 has a piston 93 mounted to reciprocate therein which carries a wrist pin 94. A connecting rod 95 has at one end thereof a crank pin bearing 96 which has a groove 97 formed therein communicating with the duct 81. The connecting rod also carries on its other end a wrist pin bearing 98 having an oil groove 99 formed therein, for lubricating the wrist pin 94.

A duct 100 extends longitudinally in the connecting rod 95 and has one end communicating with the oil groove 97 and the other end communicating with the groove 99, so that as the crank shaft rotates, oil which is intromitted into the duct 81 by the ring 78 passes through the duct 81 and is delivered to the oil groove 97. Part of this oil lubricates the crank pin 62, and part of it passes up the duct 100 to be delivered to the oil groove 99 in the wrist pin bearing 98, thereby lubricating the wrist pin 94. Some of the oil passing to the groove 99 may pass through the hollow center of the wrist pin to lubricate the walls of the cylinder 84.

The cylinder block 82 may be provided with a suitable multiple cylinder head 101.

One arrangement for lubricating the crank shaft contemplates the positioning of an oil ring 102 in the clearance slot 75 so that as the crank shaft rotates, this ring will deliver oil to the stud shaft 66. A member 103, secured to the bearing boss 74 and overlying the slot 75, serves to retain the oil ring 102 in position in the slot 75. A clearance slot 114 is formed on the other end of the bearing boss 57, and an oil ring 104 positioned in this slot delivers oil to the shaft 60 as the latter rotates. A member 115 is secured to the bearing boss 57 and overlying the clearance slot 114, serves to retain the oil ring 104 in the slot.

The outer end of the crank shaft 60 is provided with a key 105 and may carry a fly wheel or grooved pulley 106 which is secured to the crank shaft 60 by means of a set screw 107. An annular chamber 108 is formed into the outer end of the bearing boss 57 and an oil slinging collar 109 is mounted on the shaft 60 within the chamber 20. An oil duct 110 leads from the bottom of the chamber 108 to the interior of the crank case 55 for returning oil from the bearing 58 and from the slinger 109 to the main body of oil 79.

From the above description, it will be seen that applicant by having an oil ring intromit oil into angular ducts, centrifugally delivers oil to the working parts of a compressor or the like, and that the oil ring and the ducts may be so proportioned that said moving parts may be thoroughly lubricated without having an excess of oil admixed with the compressed air or gas discharged by the compressor.

Although an example of a single, and a second example of a double air compressor is herein shown and described, it is obvious that many changes may be made in the arrangement herein shown and described without departing from the spirit of the invention as set forth in the annexed claims.

What is claimed is:

1. In a device of the character described, a crank shaft having a crank, a body of oil below said crank shaft, an oil ring moved by said shaft for raising oil from said body of oil to a point above said crank shaft, and an inclined passage formed in said crank, an open end of which is adapted to scoop oil from the lateral surface of said oil ring in a comparatively narrow zone adjacent to said point as said crank shaft rotates, said ring and said passage both being in motion as the open end of the latter scoops oil from said ring, thereby causing the scooping action to be intermittent.

2. In a compressor or the like, a crank shaft having a crank and a crank pin, a crank case including a bearing for said shaft, a clearance slot formed on the inner end of said bearing, a body of oil in said crank case below said crank shaft, an oil ring in contact with said shaft, positioned in said clearance slot between said bearing and said crank and extending into said body of oil, whereby as said shaft rotates said ring delivers oil to a point above said shaft for lubricating said bearing, a connecting rod having a bearing embracing said crank pin, and a passage in said crank having one end terminating in said crank pin and the other end terminating in the radial face of said crank adjacent to one lateral face of said ring, whereby the latter end of said passage may scoop oil from said lateral face in a comparatively narrow zone adjacent to said point once during each revolution of said crank shaft and deliver the same by intromission and centrifugal force to the bearing in said connecting rod.

3. In a compressor or the like, a crank case having a bearing boss, a bearing in said boss, a crank-shaft journaled in said bearing and including a crank and a crank pin, a clearance slot formed in the inner end of said boss and above the axis thereof, a connecting rod connected to said crank pin, a wrist pin connected to said connecting rod, an angular passage extending from a lateral face of said crank adjacent to said clearance slot to the surface of said crank-pin, a passage extending in said connecting rod from said crank-pin to said wrist pin, said passages forming a series, a body of lubricating oil in said crank case, and a ring contacting said shaft and extending below the surface of said body of oil, whereby as said shaft rotates said ring also rotates delivering oil to said shaft and periodically intromits oil into said first passage, as the latter registers with said ring, whereby under the urge of centrifugal force it may pass throughout said series and lubricate said crank pin and said wrist pin.

4. In a compressor or the like, a crank shaft, a crank case, a bearing boss in said crank case including a bearing for said shaft, a cylinder, a piston in said cylinder including a wrist pin, a connecting rod having a wrist pin bearing connected to said wrist pin and a crank pin bearing connected to the crank pin of said crank shaft, a series of passages extending from the face of the crank of said crank shaft adjacent to said bearing to said crank pin and thence via said connecting rod to said wrist pin, a body of oil in said crank case, and means in said crank case for continuously raising oil to said shaft as the latter is rotated and adapted to intromit some of said oil into said passages via the open end of the passage in said crank, as the said passage intermittently moves into registration with said means whereby said oil may traverse said passages under the urge of centrifugal force for lubricating said crank pin and said wrist pin bearings.

5. In a compressor or the like, a crank case, a multi-throw crank shaft operatively mounted in said crank case, said crank shaft including a plurality of crank pins displaced laterally and angularly from each other, webs joining said crank pins and each carrying a grooved boss concentric with said crank shaft, passages having open ends terminating in said grooves and leading to midpoints in the surfaces of said crank pins, a body of oil in said crank case, ring means in said grooves and extending downwardly into said body of oil, said ring means being adapted to rotate as said crank shaft is rotated and to intermittently intromit oil into said open ends of said passages as the latter are moved into contact with said ring, whereby said oil may under the urge of centrifugal force pass therethrough to said crank pins, and connecting rods associated with said crank pins lubricated by said oil.

6. In a compressor or the like, a crank case, a double-throw crank shaft operatively mounted in said crank case including crank pins angularly displaced at 180° apart, a web joining said crank pins, a grooved boss carried on said web and having a surface concentric with the crank shaft, a passage having its open end terminating in the surface of said groove and extending to a midpoint in the surface of one of said crank pins, a second passage having its open end terminating in the surface of said groove and extending to a midpoint in the surface of the other of said crank pins, an oil ring positioned in said groove and hanging down into said body of oil, whereby when said crank shaft rotates said passages alternately and intermittently skim oil adhering to the surface of said ring from the sides thereof in comparatively narrow portions of the entire angular displacement of said shaft, said portions being defined by the movement of the open ends of said passages into registration with said ring, connecting rods connected to said crank pins and lubricated by said skimmed oil passing through said passages under the urge of centrifugal force, a cylinder block on said crank case, and pistons and cylinders in said block operatively connected to said connecting rods.

7. In a compressor or the like, a crank case, a double-throw crank shaft operatively mounted in said crank case including crank pins angularly displaced 180° apart, a web joining said crank pins, a boss carried on said web and having an open grooved surface concentric with the crank shaft, a passage having an open end terminating in said surface and extending to a midpoint in the surface of one of said crank pins, a second passage also having an open end terminating in said surface and extending to a midpoint in the surface of the other of said crank pins, an oil ring positioned in said groove and hanging down into said body of oil, whereby when said crank shaft rotates said open ends of said passages alternately and intermittently skim oil adhering to the surface of said ring from the sides thereof, connecting rods having bearings connected to said crank pins, a cylinder block on said crank case and having a pair of cylinders formed therein, pistons in said cylinders, wrist pins in said pistons, wrist pin bearings in said connecting rods connected to said wrist pins, and longitudinal passages formed in said connecting rods and extending from said crank pin bearings to said wrist pin bearings, whereby said skimmed oil passing through said passages under the urge of centrifugal force lubricates said crank pin bearings and said wrist pin bearings.

8. In a compressor, a crank shaft, bearings for said shaft, a ring oiler for lubricating said bearings while said compressor operates, and an oil passage formed in and rotating with said crank shaft for delivering oil to other moving parts in said compressor, said oil passage having an open end adapted to intermittently move into registration with and scoop off and catch oil adhering to said ring.

BURR WARD MANTLE.